United States Patent [19]

Kataoka

[11] Patent Number: 5,146,263
[45] Date of Patent: Sep. 8, 1992

[54] CAMERA PROVIDED WITH IMAGE-SHAKE PREVENTING FUNCTION

[75] Inventor: Hiroyuki Kataoka, Saitama, Japan

[73] Assignee: Canon Kabushiki Kaisha, Tokyo, Japan

[21] Appl. No.: 654,763

[22] Filed: Jan. 28, 1991

[30] Foreign Application Priority Data

Jan. 31, 1990 [JP] Japan .................................. 2-18859
Jan. 31, 1990 [JP] Japan .................................. 2-18860

[51] Int. Cl.$^5$ .................... G03B 7/08; G03B 15/00
[52] U.S. Cl. ........................................ 354/430; 354/70
[58] Field of Search ............... 354/430, 70, 286, 407, 354/408

[56] References Cited

U.S. PATENT DOCUMENTS

| | | | |
|---|---|---|---|
| 4,290,684 | 9/1981 | Hines | 354/70 |
| 4,492,452 | 1/1985 | Suzuki et al. | 354/430 |
| 4,709,138 | 11/1987 | Suda et al. | 354/408 |
| 4,733,264 | 3/1988 | Hatase et al. | 354/430 |

Primary Examiner—Russell E. Adams
Attorney, Agent, or Firm—Robin, Blecker, Daley & Driscoll

[57] ABSTRACT

A camera provided with an image-shake preventing function includes an image-shake preventing arrangement for preventing an image shake, and a restricting circuit for restricting the operation of the image-shake preventing means in response to setting of an interval shooting mode or a remote-controlled shooting mode.

4 Claims, 9 Drawing Sheets

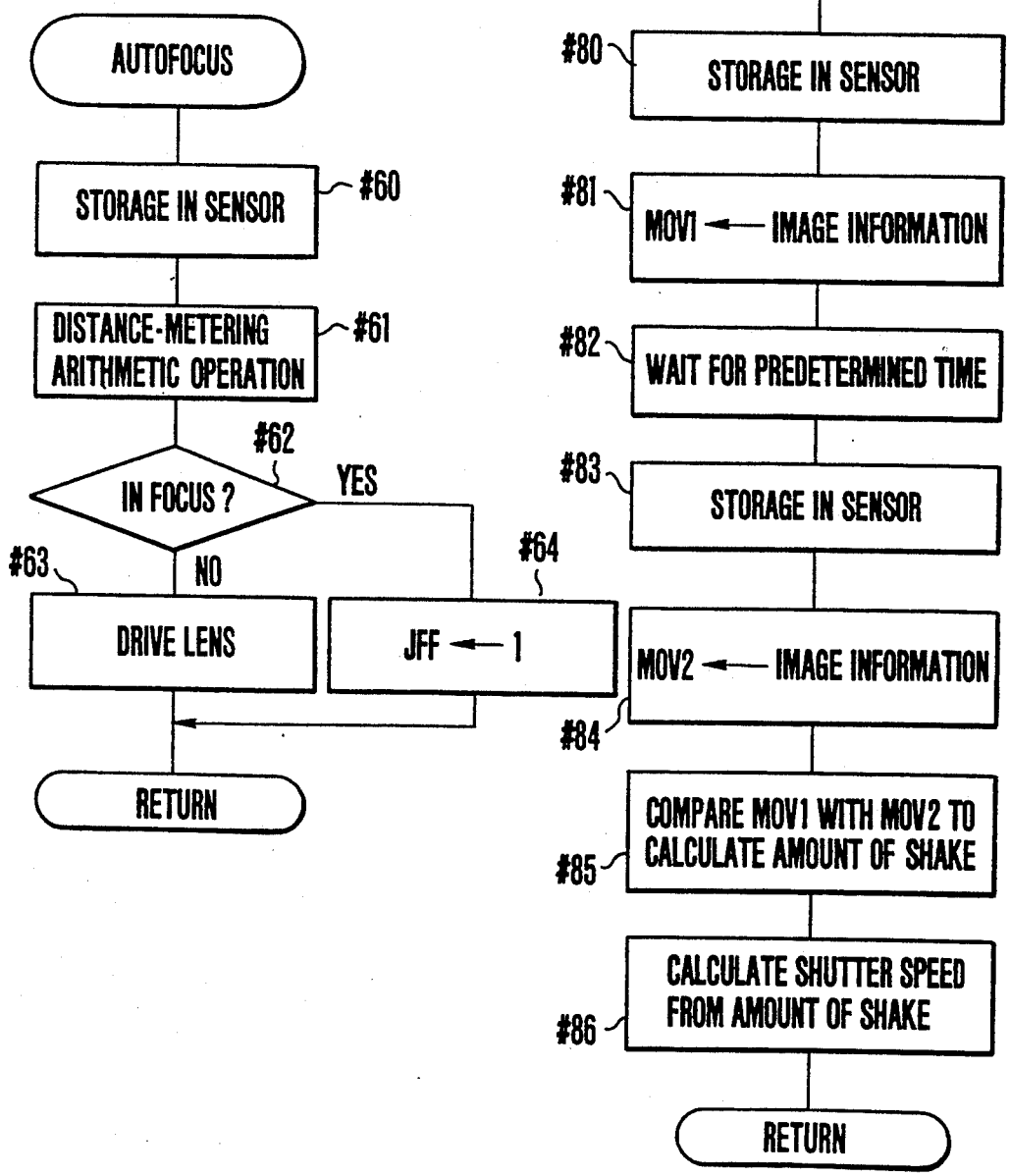

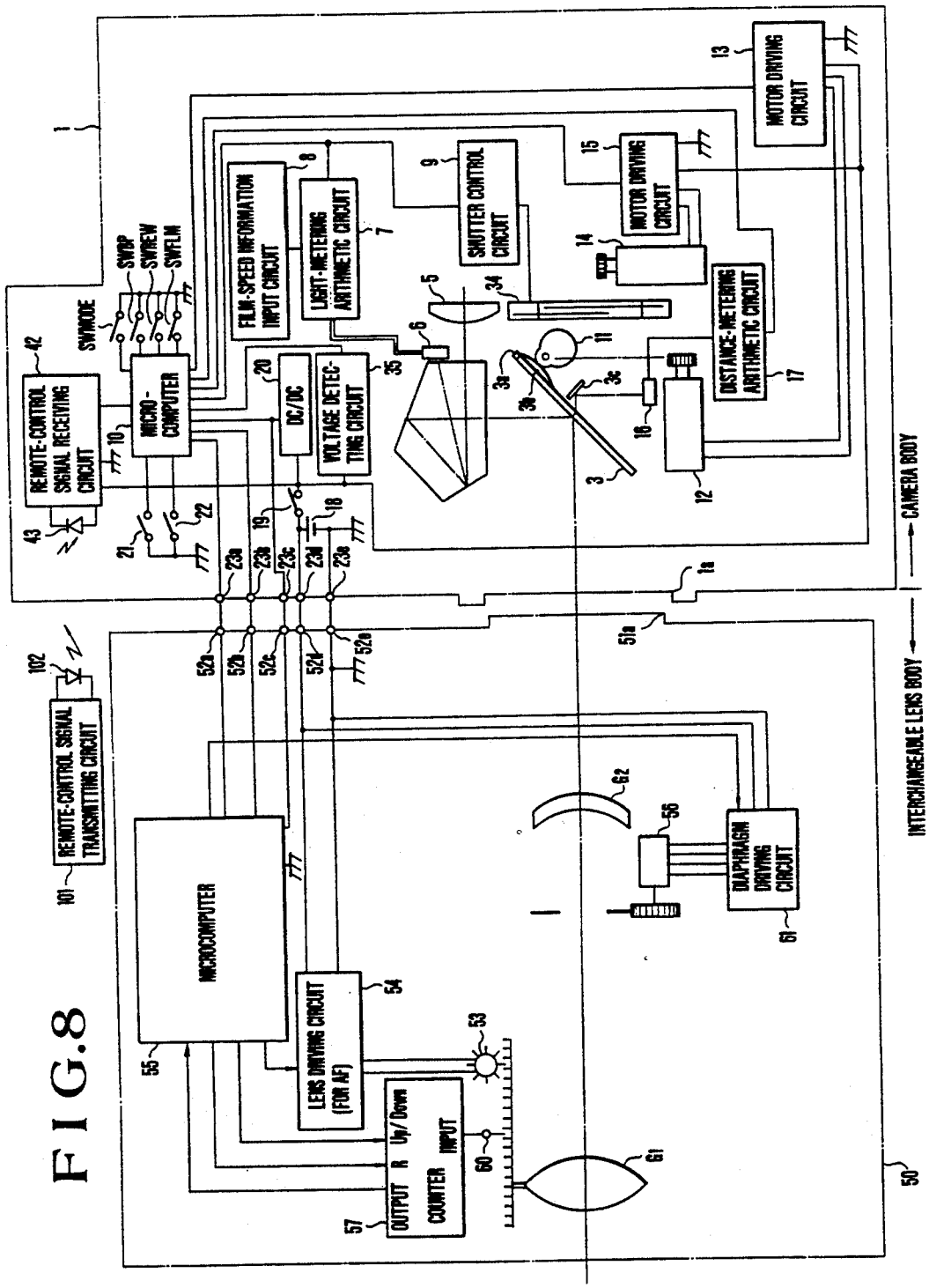

CAMERA PROVIDED WITH IMAGE-SHAKE PREVENTING FUNCTION

BACKGROUND OF THE INVENTION

1. Field of the Invention

The present invention relates to an improvement on a camera provided with the image shake preventing function of preventing a shake of a subject image.

2. Description of the Related Art

A conventional camera having the image-shake preventing function of detecting a shake of a subject image formed on its sensor and automatically setting a shutter speed which involves no shake, i.e., which can prevent the influence of an image shake from appearing in a photographed image, is disclosed in Japanese Laid-Open Patent Applications No. Sho 59-24419, Sho 59-22420, etc. (Such an image-shake preventing function will be referred to as an "IS (image stabilizer)" in the background of the invention and description of preferred embodiments.) When an IS mode is selected, this image-shake preventing function serves to set, for example, a higher shutter speed for a larger camera shake and a lower shutter speed for a smaller camera shake, thereby preventing the influence of an image shake from appearing in a photographed image.

However, if an interval shooting mode or a remote controlled shooting mode is set during the above-described IS mode, a number of problems may be encountered as described below.

In general, in the case of the interval shooting mode or the remote-controlled shooting mode, a camera is secured to a tripod or the like and no substantial camera shake occurs. As a result, if a photographer sets the IS mode, the shutter speed will be shifted to a lower speed side.

When the photographer sets the camera to the interval shooting mode or the remote controlled shooting mode, the photographer will commonly photograph a subject without viewing the state thereof through the viewfinder. In this case, if the subject is located at a corner of the image field of the viewfinder, a sensor for shake detection will fail to capture the subject. If the subject is moving, a shake occurs in a subject image, but the sensor for shake detection will fail to detect this shake. As a result, the shutter speed is still set to a low speed side and a blurred image will be photographed.

SUMMARY OF THE INVENTION

It is, therefore, an object of the present invention to provide a camera capable of overcoming the above-described problems.

Another object of the present invention is to provide a camera provided with an image-shake preventing function, which includes image-shake preventing means for preventing an image shake and restricting means for restricting the operation of the image-shake preventing means in response to setting of an interval shooting mode or a remote-controlled shooting mode. The camera having the above-described arrangement is capable of inhibiting the image-shake preventing function from being unnecessarily performed and of preventing an appropriate photographic operation from being hindered by the operation of the image-shake preventing means during interval shooting or remote-controlled shooting.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 3 is a flowchart showing an autofocus operation in the first embodiment;

FIG. 4 is a flowchart showing a camera-shake detecting operation in the first embodiment;

FIG. 8 is a schematic block diagram showing the construction of a camera according to the second embodiment.

DETAILED DESCRIPTION OF THE PREFERRED EMBODIMENTS

Preferred embodiments of the present invention will be described below in detail with reference to the accompanying drawings.

Figure 2:
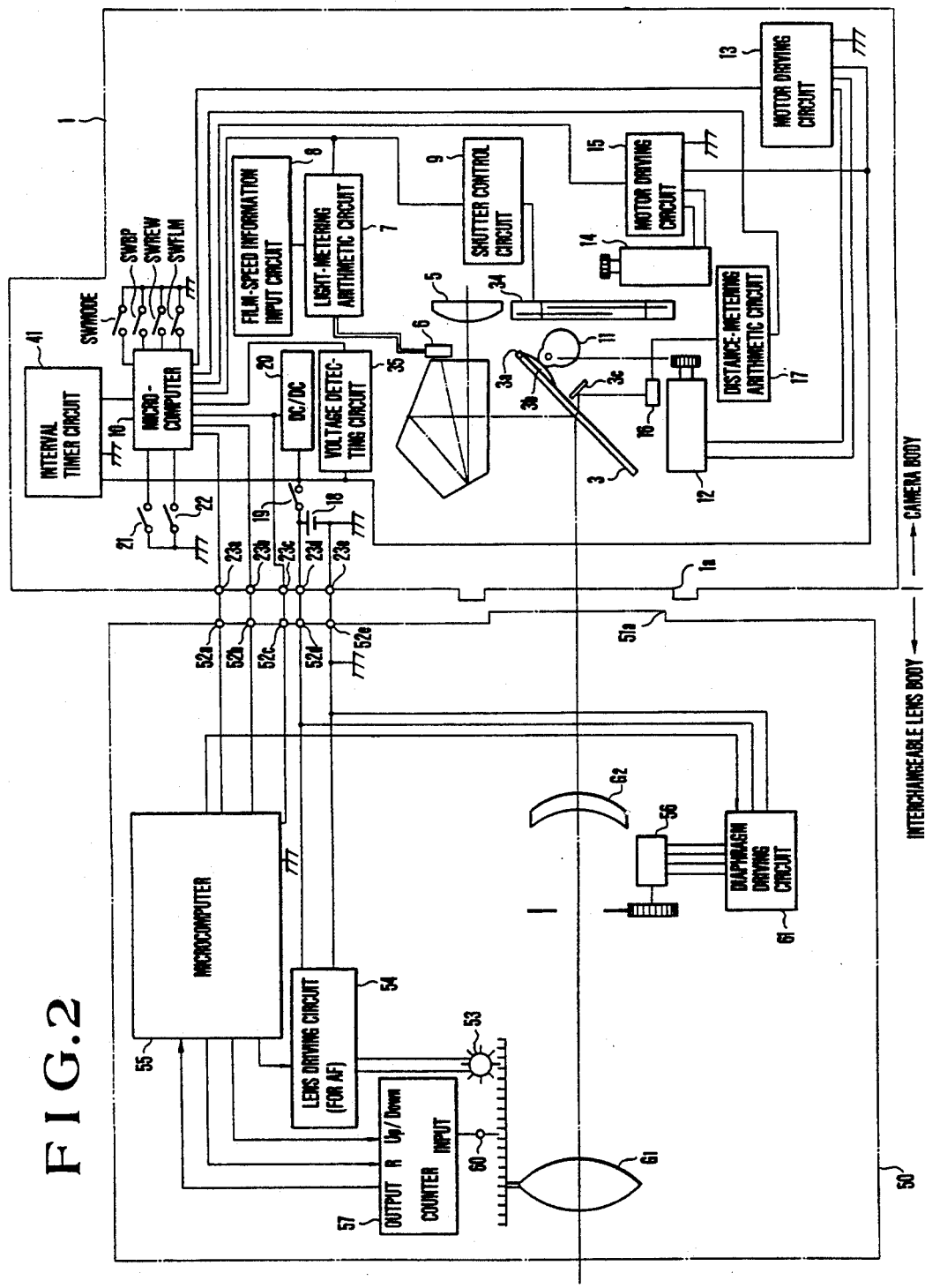
FIG. 2 is a schematic block diagram showing the construction of the camera according to the first embodiment.

FIG. 2 is a schematic view showing the construction of a camera according to a first embodiment of the present invention. The camera shown in FIG. 2 generally comprises a camera body 1 and a lens body 50 detachably secured to the camera body 1, and the camera body 1 and the lens body 50 are coupled to each other by means of a camera mount 1a and a lens mount 51a.

The camera body 1 includes a mirror 3, a pentagonal prism 4, an eyepiece lens 5, a light-metering photosensor 6, a light-metering arithmetic circuit 7, a film-speed information input circuit 8, a shutter control circuit 9, a microcomputer 10, the light-metering arithmetic circuit 7 being connected to each of the elements 8, 9 and 10, a focal plane shutter 34, a mirror rotating shaft 3a, an actuating pin 3b, a mirror actuating cam 11, the actuating pin 3b disposed in opposition to the mirror actuating cam 11, a mirror driving motor 12, a motor drive circuit 13 to which is connected the mirror driving motor 12, a film transporting motor 14 used to wind or rewind a film, a motor driving circuit 15 to which is connected the film transporting motor 14, a distance-metering sensor 16, a distance-metering arithmetic circuit 17 to which is connected the distance metering sensor 16, a battery 18 for supplying electrical power to the entire system of the illustrated camera, a main power switch 19, a DC/DC converter 20 connected between the battery 18 and the microcomputer 10, a light-distance-metering switch 21, and a release switch 22. In general, the switches 21 and 22 are actuated by a two-stroke switch button, and are arranged in such a manner that, when the release button is pressed down to a first stroke position, the switch 21 is turned on, and when it is pressed down to a second stroke position, the switch 22 is turned on.

The camera body 1 also comprises a presettable interval timer circuit 41, the interval of operation of which can be set by a switch, not shown, built in the camera. The interval timer circuit 41 is connected to the microcomputer 10.

The camera body 1 also comprises a back lid switch SWBP, a rewinding switch SWREW, a film operating switch SWFLM interlocked with the perforations of a film, and a mode selecting switch SWMODE for selecting a desired photographic mode. For the sake of simplicity of explanation, it is assumed that the first embodiment is provided with two modes: a program mode and an IS mode.

The camera body 1 has a group of contact pins 23a to 23e disposed in the vicinity of the camera mount 1a, while the lens body 50 has a group of contact pins 52a to 52e. The contact pins 23a to 23e and 52a to 52e are arranged to oppose each other, respectively.

The lens body 50 comprises photographic optical systems G1 and G2, a lens driving motor 53 for use in focus adjustment, a lens driving circuit 54 to which the lens driving motor 53 is connected, and a counter 57. As the motor 53 is made to run, a corresponding number of pulses are inputted to the counter 57. The counter 57 is arranged to be incremented as the photographic optical system G1 moves toward infinity.

The lens body 50 also comprises a diaphragm driving circuit 61 which is connected to both a microcomputer 55 and a known type of pulse motor 56. A diaphragm is driven by the motor 56.

The operation of the camera having the above-described arrangement and construction will be described below.

First of all, the operation of the camera in a general photographic mode (program mode) will be described. When the main power switch 19 of the camera body 1 is turned on to activate the DC/DC converter 20, the DC/DC converter 20 supplies a constant operating voltage to the microcomputer 10. When the light-distance metering switch 21 is depressed, the quantity of light detected by the light-metering photosensor 6 is transmitted to the light-metering arithmetic circuit 7, which thus memorizes the amount of exposure by a known method. Further, the light-distance-metering switch 21 serves as a trigger switch for triggering an automatic distance metering operation. Accordingly, when the light-distance-metering switch 21 is depressed, the distance metering sensor 16 is activated in accordance with an instruction sent from the microcomputer 10 and the distance-metering arithmetic circuit 17 performs distance-metering arithmetic operations utilizing a known method (the operation of detecting the state of focus and calculating the amount of defocus), thereby determining the amount by which the photographic optical system G1 should be moved forward. Then, the microcomputer 10 performs known serial communication with the microcomputer 55 disposed in the lens body 50. The microcomputer 55 sends to the lens driving circuit 54 an instruction indicative of the direction of running of the lens driving motor 53, thereby moving the photographic optical system G1. While the photographic optical system G1 is being moved, the contents of the counter 57 are simultaneously varied by a ratchet 60 in correspondence with the movement of the photographic optical system G1, and the microcomputer 55 can read out the number of pulses counted by the counter 57 to detect the amount of movement of the photographic optical system G1.

Accordingly, the photographic optical system (hereinafter referred to simply as a "lens") G1 is made to move by the above-described amount which has been specified by the camera body 1, and is brought to rest at an in-focus position. In general, distance metering is again performed, and if it is determined that an in-focus state is obtained, the camera body 1 provides an in-focus indication or generates an in-focus sound.

The operation carried out when the IS mode is selected will be schematically described below.

In the IS mode, when an in-focus state is reached as a result of the above-described autofocus operation, the amount of shake provided on the distance-metering sensor 16 is detected and the shutter speed is varied on the basis of the amount of shake. (The shutter speed is set within a speed range which can provide a circle of least confusion.)

However, in the event that interval shooting is specified by the interval timer circuit 41, the IS mode is cleared to perform normal photography, for example, program-mode photography.

The operation of the above described camera will be described below in detail with reference to the flowcharts shown in FIGS. 1A, 1B and 3 to 7.

Although not specifically shown, the above-described microcomputer 10 includes a film-frame number register FRAMER for memorizing the number of film frames, a count register COUNT for counting the number of ON's and OFF's of the film operating switch SWFLM, memory registers MOV1 and MOV2 for memorizing image information, a back-lid flag BPF for memorizing the state of a back lid (if the value of the back-lid flag BPF is "1", this indicates that the back lid is open), an IS mode flag ISF for memorizing "1" if the IS mode is selected by the mode selecting switch SWMODE, an interval flag INTF for memorizing "1" when interval shooting is specified, an in-focus flag JFF for memorizing "1" when an in-focus state is obtained as a result of an autofocus operation, and a rewind flag REWF for memorizing "1" when execution of film rewinding is set by a rewind switch SWREW or if a film stretch is detected.

In the following explanation of the embodiment, the light-distance-metering switch 21 is indicated as a switch SW1, and the release switch 22 as a switch SW2.

Figure 1A:
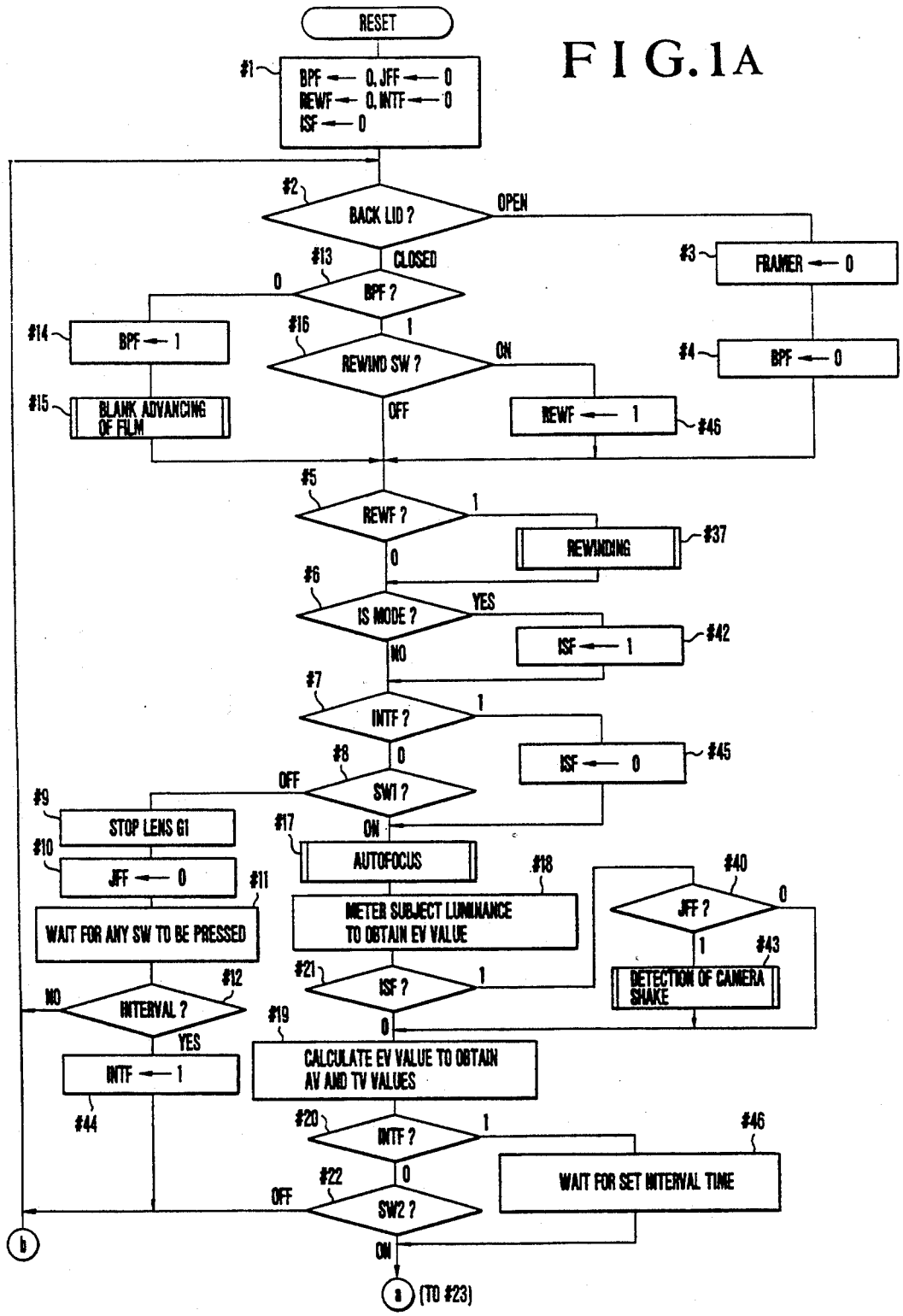
FIGS. 1A and 1B constitute a main flowchart showing the operation of a camera according to a first embodiment of the present invention.

When the main power switch 19 is turned on to activate the DC/DC converter 20, the DC/DC converter 20 supplies a constant operating voltage to the microcomputer 10 to cause it to initiate an operation starting with Step #1 of FIG. 1A. It is assumed here that the back lid is open with all the switches off.

Step #1 All flags and registers are initialized.

Step #2

The state of the back lid switch SWBP is identified. Since the back lid is now open, the process proceeds to Step #3.

Step #3 The film-frame number register FRAMER is cleared to "0".

Step #4

The back-lid flag BPF is cleared.

Step #5

The state of the rewind flag REWF is identified. Since the rewind flag REWF has been cleared in Step #1, the process proceeds to Step #6.

Step #6

It is determined whether the IS mode is selected by the mode selecting switch SWMODE. It is assumed here that the program mode is selected. The process therefore proceeds to Step #7.

Step #7

It is determined whether interval shooting is specified by the interval timer circuit 41, by making reference to the state of the interval flag INTF. Since no interval shooting is specified and the state of the interval flag INTF is "0", the process proceeds to Step #8.

Step #8

The state of the switch SW1 is identified. Since it is off, the process proceeds to Step #9.

Step #

If the lens G1 is in operation, it is stopped.

Step #10

The in-focus flag JFF is cleared.

Step #11

The process waits for any switch to be operated. In this step, the input supplied from the interval timer circuit 41 is regarded as a switch input.

If a photographer loads a film and closes the back lid, the state of the back-lid switch SWBP varies and the proceeds from Step #11 to Step #12.

Step #12

Whether interval shooting is specified is identified. Since no interval shooting is specified, the process returns to Step #2.

Subsequently, the process proceeds from Step #2 to Step #3. Since the back-lid is now closed, the process proceeds to Step #13.

Step #13

The state of the back-lid flag BPF is identified. Since it is now cleared to "0" in Step #4, the process proceeds to Step #14.

Step #14

The back-lid flag BPF is set to "1".

Step #15

Figure 5:
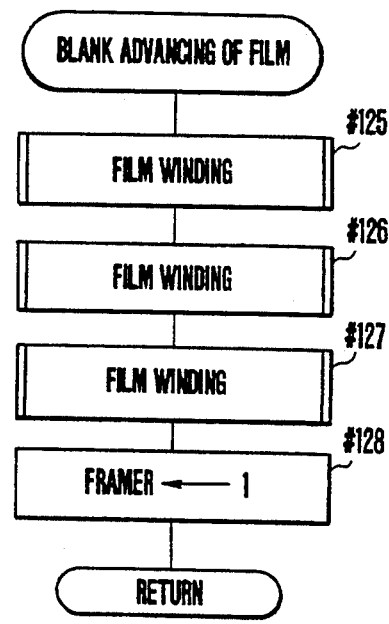
FIG. 5 is a flowchart showing a blank-film-frame advancing operation in the first embodiment.

The subroutine FILM BLANK ADVANCE shown in FIG. 5 is called to carry out the operation of advancing blank frames of the film.

Such a blank-advancing operation will now be explained with reference the flowchart of FIG. 5.

Steps #125, #126, #127

The subroutine FILM WINDING shown in FIG. 6, which will be described later, is called three times. Thus, the film is advanced by three blank frames. Upon completion of the blank-advancing operation, the process proceeds to Step #128.

Step #128

"1", that is, information indicative of the first frame, is set in the film frame number register FRAMER.

Upon completion of the above-described blank-advancing operation, the process proceeds to Step #5. Subsequently, the process proceeds along Steps: #5→#6→#7 →#8→#9→#10→#11. In Step #11, the process waits for a change to occur in the state of an arbitrary switch.

If the photographer aims the camera at a subject to be photographed and depresses the switch SW1, the process proceeds along Steps: #11→#12→#2. Since the back lid is now closed, the process proceeds from Step #2 to Step #13, where the state of the back-lid flag BPF is identified. Since the back-lid flag BPF has been set to "1" in Step #14, the process proceeds to Step #16.

Step #16

The state of the rewind switch SWREW is identified. Since it is off, the process proceeds to Step #5. By utilizing the back lid BPF in the above described manner, it is possible to achieve the arrangement of performing a blank-advancing operation only once when the back lid is closed.

Subsequently, the process proceeds along Steps: #5 →#6→#7→#8. In Step #8, the state of the switch SW1 is identified as described above. Since the switch SW1 is now on, the process proceeds to Step #17.

[Step #17

The subroutine AUTOFOCUS shown in FIG. 3 is called to carry out an autofocus operation. The lens G1 is therefore moved to a position where the aforesaid subject is in focus. Details of the autofocus operation will be described later.

Upon completion of the autofocus operation, the process returns to the main routine and initiates an operation starting with Step #18.

Step #18

The luminance of the subject is metered to obtain an EV value. The process proceeds to Step #21.

Step #21

The state of the IS mode flag ISF is identified. Since the state of the IS mode flag ISF is "0", the process proceeds to Step #19.

Step #19

A shutter speed (TV) and an aperture value (AV) are obtained through arithmetic operations using the EV value. Since the program mode is selected as the photographic mode, the shutter speed (TV) and the aperture value (AV) which match the program mode are obtained in a known manner.

Step #20

The state of the interval flag INTF is identified. Since the state of the interval flag INTF is "0", the process proceeds to Step #22.

Step #22

The state of the switch SW2 is identified. Since the switch SW2 is off, the process returns to Step #2.

In this manner, while the switch SW1 is being pressed, an autofocus operation and a light-metering operation are repeated. When the switch SW1 is turned off, the process proceeds from Step #8 to Step #9, where the lens G1 is stopped. In the next step #10, the in-focus flag JFF is cleared and the process proceeds to Step #11. In Step #11, the process waits for a change to occur in the state of any switch as described above.

Figure 1B:
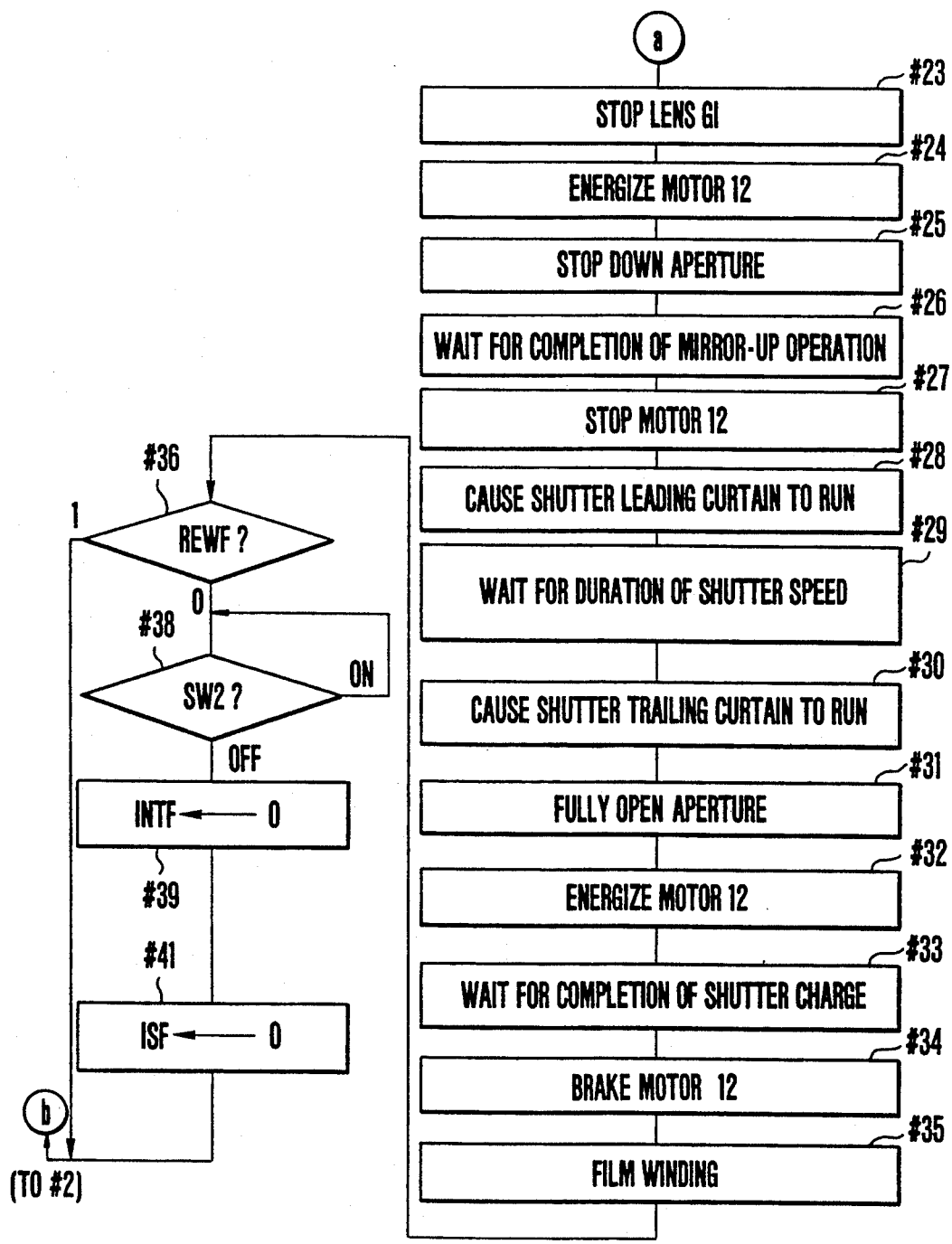

When the switch SW1 is depressed as described above and the switch SW2 is also depressed, the process proceeds from Step #22 to a release sequence subsequent to Step 23 of FIG. 1B.

Step #23

The lens G1 which is being moved by the autofocus operation is stopped.

Step #24

The mirror driving motor 12 is energized to initiate a mirror-up operation.

Step #25

Serial communication with the microcomputer 55 incorporated in the lens body 50 is performed and the diaphragm is stopped down to the value obtained in Step #19.

Step #26

The process waits for completion of the mirror-up operation initiated in Step #24. Upon completion, the process proceeds to Step #27.

Step #27

The mirror driving motor 12 is de-energized.

Step #28

A shutter leading curtain is made to run by the shutter control circuit 9.

Step #29

The process waits for only the duration of the shutter speed obtained in Step #19. When the duration elapses, the process proceeds to Step #30.

Step #30

A shutter trailing curtain is made to run by the shutter control circuit 9.

Step #31

Serial communication with the microcomputer 55 incorporated in the lens body 50 is performed and the diaphragm is fully opened.

Step #32

The mirror driving motor 12 is energized to initiate mirror-down and shutter-charge operations.

Step #33

The process waits for completion of the shutter-charge operation. Upon completion, the process proceeds to Step #34.

Step #34

The mirror driving motor 12 is braked.

Step #35

Figure 6:
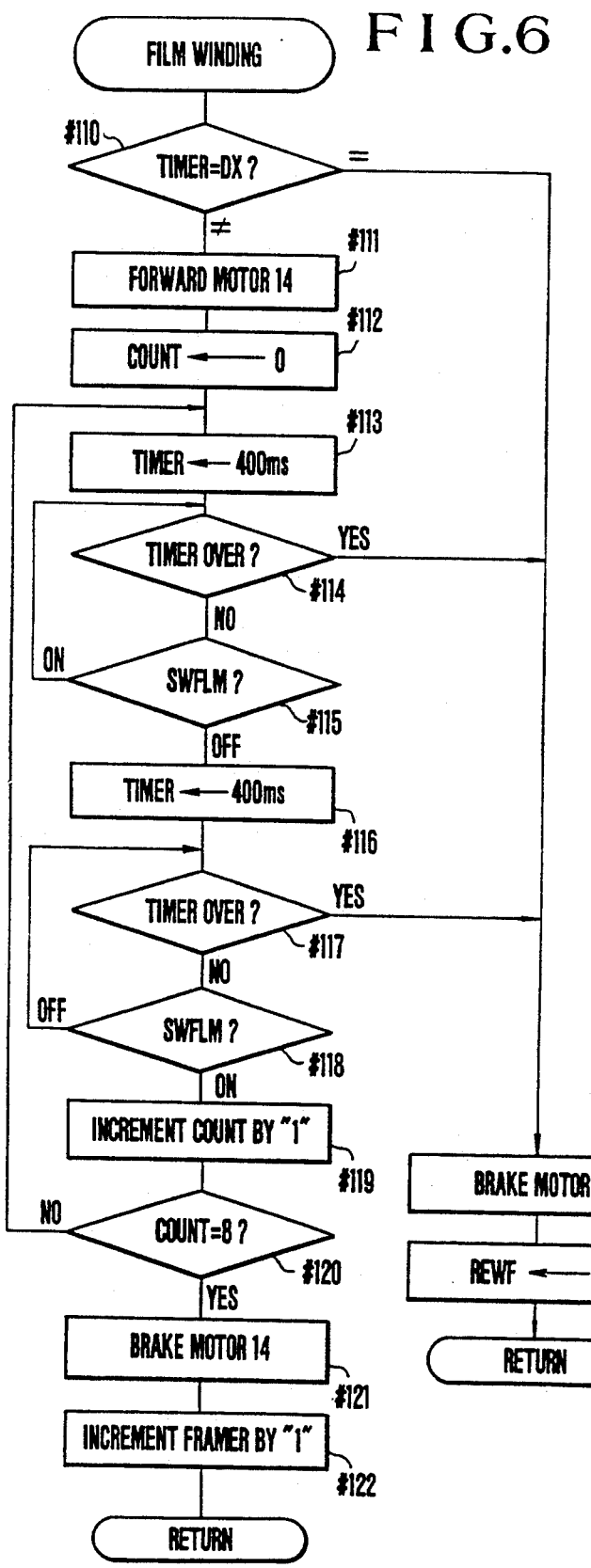
FIG. 6 is a flowchart showing a film winding operation in the first embodiment.

The subroutine FILM WINDING shown in FIG. 6 is called and the film is wound, for example, by one frame.

The film winding operation, etc., will now be explained with reference to FIG. 6. This operation is initiated at Step #110.

Step #110

The value of the film-frame number register FRAMER is compared with the number of film frames read by a DX code reading circuit (not shown). If both are equal, the process proceeds to Step #123; otherwise, the process proceeds to Step #111.

Step #111

The film transporting motor 14 is forwarded to initiate film winding.

Step #112

The count register COUNT is cleared.

Step #113

The time of a film stretch timer is set to 400 milliseconds.

Step #114

If the film stretch timer times out, the process proceeds to Step #123; otherwise, the process proceeds to Step #115.

Step #115

If the film operating switch SWFLM is on, the process returns to Step #114; if it is off, the process proceeds to Step #116.

Accordingly, if the film is wound up and the film operating switch SWFLM is turned off during 400 milliseconds, the process proceeds to Step #116. In contrast, if the film stretches and cannot be wound and the film operating switch SWFLM remains on for 400 milliseconds, the process proceeds to Step #123.

Step #116

The film stretch timer is set to 400 milliseconds.

Step #117

If the timer times out, the process proceeds to Step #123; otherwise, the process proceeds to Step #118.

Step #118

If the film operating switch SWFLM is turned off, the process returns to Step #117. If it is on, the process proceeds to Step #119.

Unlike the flow of Steps #113 to #115, in Steps #116 to #118, the process waits for the film operating switch SWFLM to be turned on.

Step #119

The count register COUNT is incremented by "1".

Step #120

It is determined whether the contents of the count register COUNT have reached "8". If so, the process proceeds to Step #121; if not, the process returns to Step #113. In other words, if the film operating switch SWFLM is turned on and off eight times during Steps #111 to #120, the process proceeds to Step #121.

Step #121

Since the film has been wound by one frame, the film winding motor 14 is braked.

Step #122

The film-frame number register FRAMER is incremented by "1".

If a film stretch occurs during film winding or the number of exposed frames reaches the number of exposures specified by the DX code of the film, the process proceeds to Step #123.

Step #123

The film winding motor 14 is braked.

Step #124

The rewind flag REWF is set to "1" and the process returns to the main routine.

When the above-described film rewinding operation is completed, the operation starting with Step #36 of FIG. 1B is again performed.

Step #36

The state of the rewind flag REWF is identified. If the value of the rewind flag REWF is "1", that is, if one frame of film is not wound in the above-described film winding operation, the process returns to Step #2. If the value of the rewind flag REWF is "0", the process returns to Step #38.

Initially, explanation is given of operations which will be performed after it has been determined in Step #36 that the value of the rewind flag REWF is "1" and the process has returned to Step #2.

In this case, the process proceeds along Steps: #2 →#13→#16→#5. In Step #5, the state of the rewind flag REWF is identified and, since the rewind flag REWF has been set to "1" in Step #36, the process proceeds to Step #37.

Figure 7:
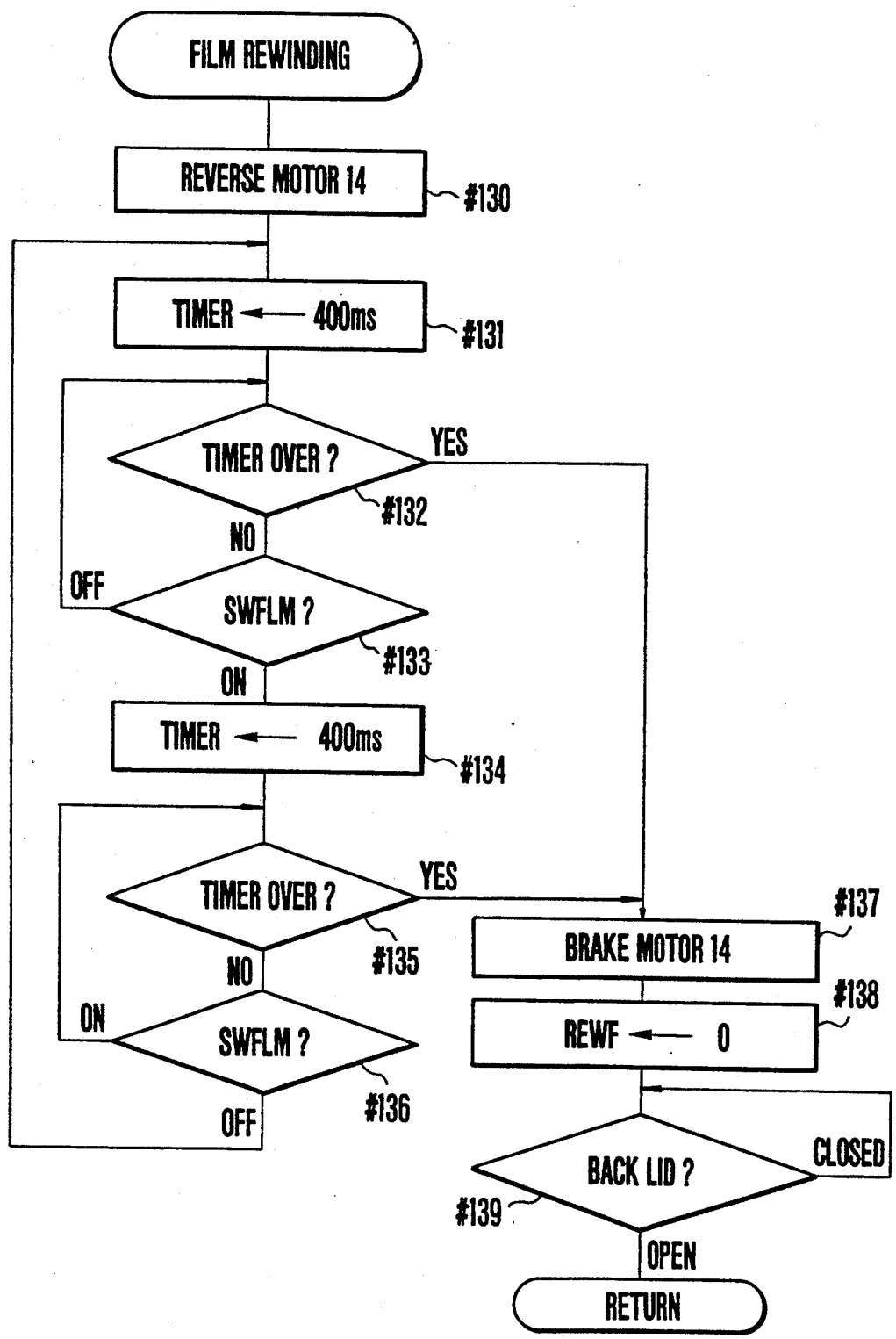
FIG. 7 is a flowchart showing a film rewinding operation in the first embodiment.

Step #37 p The subroutine FILM REWINDING shown in FIG. 7 is called to initiate a film rewinding operation.

The film rewinding operation will now be explained with reference to FIG. 7. This operation is initiated at Step #130.

Step #130

The film transporting motor 14 is reversed to initiate film rewinding.

Step #131

The timer is set to 400 milliseconds.

Step #132

If the timer completes counting 400 milliseconds, the process proceeds to Step #137. If not, the process proceeds to Step #133.

Step #133

While the film operating switch SWFLM is off, the process repeats Steps #132 and #133. If the timer has not yet completed counting 400 milliseconds and the switch SWFLM is turned on, the process proceeds to Step #134.

Step #134

The timer is set to 400 milliseconds.

Step #135

If the timer completes counting 400 milliseconds, the process proceeds to Step #137. If not, the process proceeds to Step #136.

Step #136

While the film operating switch SWFLM is off, the process repeats Steps #132 and #133. In other words, since the film operating switch SWFLM is turned on and off while the film is being rewound, the process repeats the loop of Steps #131 to #136. When film rewinding is completed, the film operating switch SWFLM stops its switching operation. The timer completes counting 400 milliseconds, and the process proceeds to Step #137.

Step #137

Since film rewinding has been completed, the film transporting motor 14 is braked.

Step #138

The rewind flag REWF is cleared.

Step #139

The process repeats Step #139 until the back lid is opened.

On the other hand, if it is determined in Step #36 that the value of the rewind flag REWF is "0", the process proceeds from Step #36 to Step #38.

Step #38

The process waits for the switch SW2 to be turned off.

Step #39

The interval flag INTF is cleared, and the process proceeds to Step #41.

Step #41

The IS mode flag ISF is cleared, and the process returns to Step #2.

The following explanation is made in connection with operations which will be performed when the IS mode is selected by the mode selecting switch SWMODE.

If the IS mode is selected by the mode selecting switch SWMODE and a photographer depresses the switch SW1 while aiming the camera at a subject, the process proceeds along Steps: #11→#12→#2→#13→#16→#5→#6 in the flowchart shown in FIG. 1A. In Step #6, it is determined whether the IS mode is now selected Since the IS mode is now selected, the process proceeds from Step #6 to Step #42.

Step #42

The IS mode flag ISF is set to "1".

Subsequently, the process proceeds from Step #42 to Steps #7 and #8. In Step #8, the state of the switch SW1 is identified. Since the switch SW1 is on, the process proceeds from Step #8 to Step #17, where the subroutine AUTOFOCUS is called to initiate an autofocus operation.

The autofocus operation will be described below with reference to FIG. 3. This operation is initiated with Step #60.

Step #60

Storage in the distance metering sensor 16 is effected, and the process proceeds to Step #61.

Step #61

The distance-metering arithmetic circuit 17 performs distance metering arithmetic operations, and the process proceeds to Step #62.

Step #62

It is determined whether an in-focus state has been obtained. If not, the process proceeds to Step #63; otherwise, the process proceeds to Step #64.

Step #63

Serial communication with the microcomputer 55 incorporated in the lens body 50 is performed to drive the lens G1.

Subsequently, the process returns to the main routine and proceeds along Steps: #18→#21. In Step #21, the state of the IS mode flag ISF is identified. If the value of the IS mode flag ISF is "1", the process proceeds to Step #40.

Step #40

The state of the in-focus flag JFF is identified. Since the flag JFF now indicates the presence of a defocus state (JFF=1), the process proceeds to Step #19.

In Step #19, since the defocus state has been detected, temporary setting of the TV and AV values which match the program mode is performed.

Subsequently, the process proceeds along Steps: #19→#20→#22. In Step #22, since the switch SW2 is off, the process returns to Step #2.

If it is determined in Step #62 that an in-focus state has been obtained, the process proceeds to Step #64.

Step #64

The in-focus flag JFF is set to "1".

Subsequently, the process returns to the main routine and proceeds along Steps: #18→#21→#40. In Step #40, the state of the in-focus flag JFF is identified. Since the in-focus flag JFF has been set to "1" in Step #64, the process returns to Step #43, where the subroutine DETECTION OF CAMERA SHAKE shown in FIG. 4 is called to initiate a camera-shake detecting operation.

The camera-shake detecting operation will be explained below with reference to FIG. 4. This operation is initiated with Step #80. The autofocus system used in the first embodiment is assumed to employ a phase difference detecting method.

Step #80

Storage in the distance-metering sensor 16 is performed, and the process proceeds to Step #81.

Step #81

Image information obtained by the above-described storage operation is memorized in the memory register MOV1.

Step #82

The process waits for a predetermined period of time.

Step #83

Storage in the distance-metering sensor 16 is again performed, and the process proceeds to Step #84.

Step #84

Image information obtained by the above-described storage operation is memorized in the memory register MOV2.

Step #85

The image information of the memory register MOV1 is compared with that of the memory register MOV2 to find the amount of defocus.

Step #86

A shutter speed which can provide a circle of least confusion is obtained on the basis of the amount of defocus, and the process returns to the main routine.

Subsequently, the process proceeds from Step #86 to Step #19, where the AV value is calculated from the shutter speed (TV value) on the basis of the previously obtained EV value. The process then proceeds along Steps #20→#22.

When the photographer turns on the switch SW2, the process proceeds to the above-described release sequence, where IS-mode shooting is carried out. In Steps #39 and #41, the interval flag INTF and the IS mode flag ISF are initialized, respectively.

The following explanation is now made in connection with operations which are performed when interval shooting is specified with the IS mode selected.

If the selection of interval shooting is transmitted from the interval timer circuit 41 to the microcomputer 10 while the process is waiting for a change to occur in the state of an arbitrary switch in Step #11, the process proceeds to Step #12. Since the interval shooting is now specified, the process proceeds to Step #44.

Step #44

Since the interval shooting is specified, the interval flag INTF is set to "1", and the process returns to Step #2.

Subsequently, the process proceeds along Steps: #2→#13→#16→#5→#6→#4→#2→#7. In Step #7, the state of the interval flag INTF is identified. Since the interval flag INTF has been set to "1" in Step #44, the process proceeds to Step #45.

Step #45

The IS mode flag ISF is cleared to "0".

Accordingly, even if the interval shooting is specified with the IS mode selected, the photographic mode is forcedly switched to the program mode.

Subsequently, the process proceeds along Steps: #45→#17→#18→#21→#19→#20. In Step #20, the state of the interval flag INTF is identified. Since the value of the interval flag INTF is now "1", the process proceeds to Step #46.

Step #46

The process waits for the set time of interval shooting.

Subsequently, the process proceeds to Step #23 of the release sequence of FIG. 1B. Since the following operations are similar to those performed in the above-described program mode, explanation of the operations is omitted.

In accordance with the first embodiment, if the interval shooting is specified with the IS mode selected, the IS-mode shooting is inhibited to automatically switch to the program mode (Steps #7 to #45 of FIG. 1A). Accordingly, an unnecessary IS operation does not occur during interval shooting which can usually be effected without camera shake since the camera is secured to a tripod or the like. In addition, since the IS operation is inhibited to automatically switch to the program mode, a change in shutter speed does not occur so that proper interval shooting can be implemented even in moving-subject photography.

FIG. 8 is a schematic view showing the construction of a camera according to a second embodiment of the present invention. In FIG. 8, the same reference numerals are used to denote elements which are the same as those used in the camera shown in FIG. 2, and explanation thereof is omitted.

Referring to FIG. 8, the camera body 1 includes a remote-control signal receiving circuit 42. When a light receiving element 43 receives a remote-control signal, the circuit 42 informs the microcomputer 10 of that fact.

An element 101 is a remote-control signal transmitting circuit for outputting a remote-control signal to the remote-control signal receiving circuit 42 by means of a light emitting element 102.

The operation of the camera having the above-described arrangement and construction will be described below.

The operation of a general shooting mode (program mode) is substantially identical to the operation of the one explained in connection with the first embodiment shown in FIG. 2, and explanation thereof is omitted.

The operation carried out when the IS mode is selected will be schematically described below.

In the IS mode, when an in-focus state is reached as a result of the above-described autofocus operation, the amount of shake provided on the distance-metering sensor 16 is detected and the shutter speed is varied on the basis of the amount of shake. (The shutter speed is set within a speed range which can provide a circle of least confusion.)

However, if remote-controlled shooting is specified in accordance with a remote-control signal transmitted from the remote-control signal transmitting circuit 101, the IS mode is cleared to perform normal photography, for example, program-mode photography.

Figure 9A:
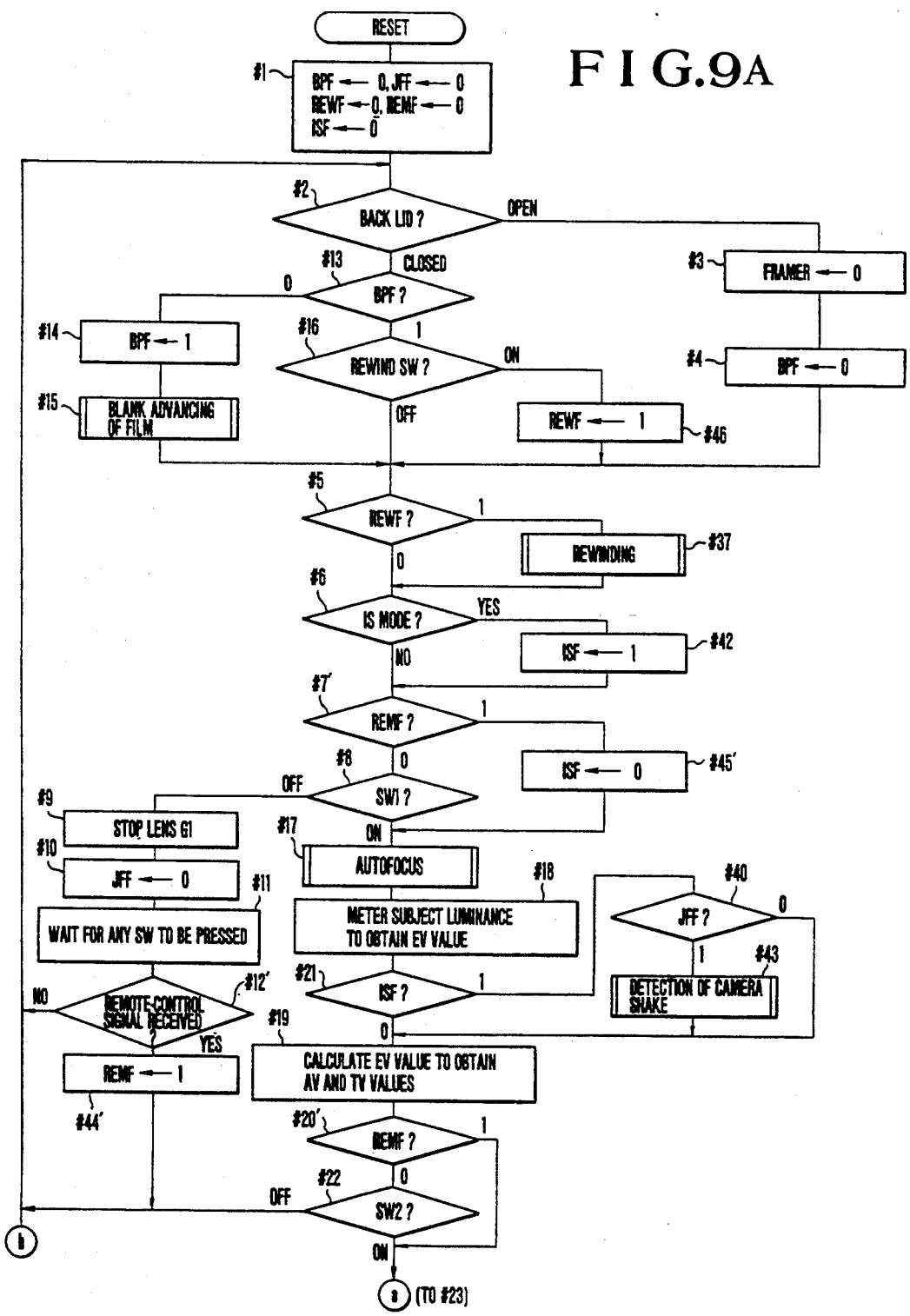
FIGS. 9A and 9B constitute a flowchart showing the operation of the camera shown in FIG. 8.
Figure 9B:
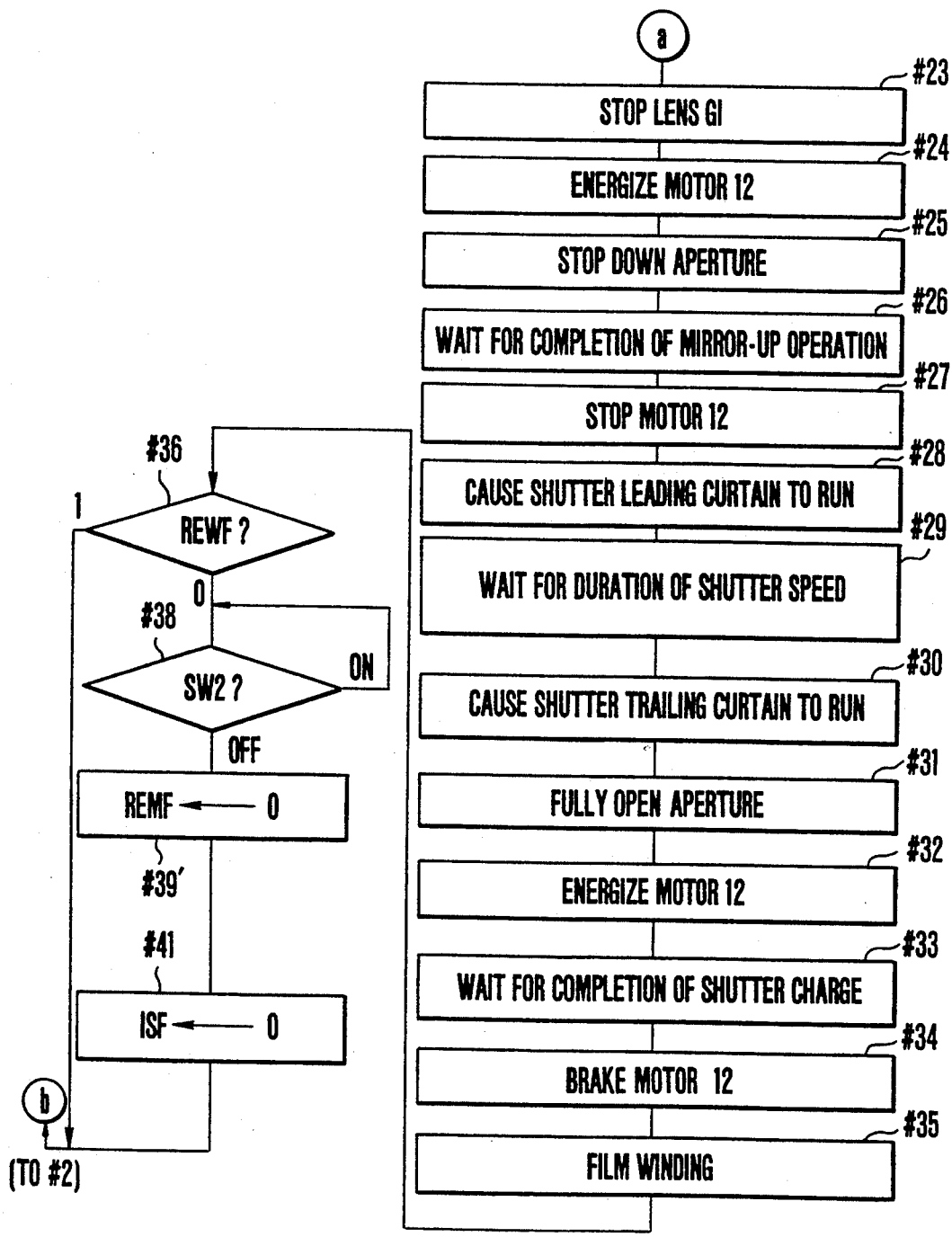

The operation of the camera of FIG. 8 will be described below in detail with reference to the flowcharts shown in FIGS. 9A and 9B. In the flowcharts of FIGS. 9A and 9B, the same step numbers are used to denote steps which correspond in operation to the steps shown in FIGS. 1A and 1B, and explanation thereof is omitted.

The following explanation is made in connection with operations which are performed when remote-controlled shooting is specified with the IS mode selected.

While the process is waiting for a change to occur in the state of any switch in Step #11, if a remote-control signal is transmitted from the remote-control signal transmitting circuit 101 through the light emitting element 102 and the selection of remote-controlled shooting is transmitted from the remote-control signal receiving circuit 42 to the microcomputer 10 through the light receiving element 43, the process proceeds to Step #12, Since the remote controlled shooting is now specified, the process proceeds to Step #44'.

Step #44'

The remote-control flag REMF is set to "1" and the process returns to Step #2.

Subsequently, the process proceeds along Steps: #2→#13→#16→#5→#6→#4→#2→#7'. In Step #7', the state of the remote-control flag REMF is identified and, since the remote-control flag REMF has been set to "1" in Step #44', the process proceeds to Step #45'.

Step #45'

The IS mode flag ISF is cleared to "0".

Accordingly, even if remote-controlled shooting is specified with the IS mode selected, the photographic mode is forcibly switched to the program mode.

Subsequently, the process proceeds along Steps: #45→#17→#18→#21→#19→#20'. In Step #20', the state of the remote-control flag REMF is identified. Since the value of the remote-control flag REMF is now "1", the process proceeds to Step #23 of the release sequence shown in FIG. 1B. Since the following operations are similar to those performed in the above-described program mode, explanation thereof is omitted.

In accordance with the second embodiment, if the remote-controlled shooting is specified with the IS mode selected, the IS-mode shooting is inhibited to automatically switch to the program mode (Steps #7' to #45' of FIG. 9A). Accordingly, an unnecessary IS operation does not occur during remote-controlled shooting which can usually be effected without camera shake since the camera is secured to a tripod or the like. In addition, since the IS operation is inhibited to automatically switch to the program mode, a change in shutter speed does not occur so that proper remote-controlled shooting can be implemented even in moving-subject photography.

Although each of the above-described embodiments utilizes a method of detecting a camera shake on the basis of variations in an image signal with time, it is a matter of course that the present invention can be applied to any other detecting method, such as a method of detecting the motion of a camera itself by means of an accelerometer.

Although each of the above-described embodiments utilizes a method of preventing an image shake by shifting a shutter speed, it is a matter of course that the present invention can be applied to any other image-shake preventing method, such as a method using an image-stabilizing optical system.

Although each of the above-described embodiments utilizes a method of completely inhibiting execution of an image-shake preventing operation during the interval shooting mode or the remote-controlled shooting mode, the present invention can, of course, be applied to a method of implementing an image-shake preventing operation having a certain kind of restriction, for example, an image-shake preventing operation utilizing a method of partially restricting the manner of shifting a shutter speed.

As a matter of course, the scope of the present invention is to be broadly interpreted so as to encompass any kind of combination of the above-described embodiments. In addition, the present invention is, of course, intended to restrict an image shake preventing operation in the case of any shooting mode that may be selected with a camera secured to a tripod or the like, as well as in the case of the interval shooting mode or the remote-controlled shooting mode.

What is claimed is:

1. A camera provided with an image-shake preventing function, comprising:
   (A) image-shake preventing means for preventing an image shake; and
   (B) restricting means for restricting an operation of said image-shake preventing means in response to setting of an interval shooting mode or a remote-controlled shooting mode.

2. A camera according to claim 1, wherein said image-shake preventing means includes detecting means for detecting a shake of a subject image.

3. A camera according to claim 1, wherein said image-shake preventing means includes means for shifting a shutter speed.

4. A camera according to claim 1, wherein said restricting means includes means for inhibiting the operation of said image-shake preventing means.

* * * * *